(12) United States Patent
Wiltjer et al.

(10) Patent No.: US 6,419,400 B1
(45) Date of Patent: Jul. 16, 2002

(54) FIBER OPTIC SLEEVE WITH DRAFTED CORNER-WALL SECTIONS

(75) Inventors: Jerry A. Wiltjer, Frankfort; Edward G. Blomquist, Plainfield, both of IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/545,343

(22) Filed: Apr. 7, 2000

(51) Int. Cl.⁷ .................................................. G02B 6/38
(52) U.S. Cl. ............................. 385/55; 385/60; 385/66; 385/70; 385/72; 385/77; 385/78; 385/84
(58) Field of Search .................... 385/53–60, 70–73, 385/76, 77, 78, 66, 67, 83, 84, 86; 439/374, 345, 346, 361, 362, 364

(56) References Cited

U.S. PATENT DOCUMENTS 5,675,682 A * 10/1997 De Marchi .................. 385/77
5,867,621 A * 2/1999 Luther et al. ................ 385/59
6,149,313 A * 11/2000 Gieble et al. ................ 385/59

FOREIGN PATENT DOCUMENTS

EP          0 973 052 A2      1/2000
EP          1 041 417 A2  *  10/2000

* cited by examiner

Primary Examiner—Rodney Bovernick
Assistant Examiner—Juliana K. Kang
(74) Attorney, Agent, or Firm—Robert A. McCann; Jay A. Saltzman; Christopher S. Clancy

(57) ABSTRACT

A coupler having converging corner-wall sections is disclosed. Convergence thereof provides the draft necessary to remove the coupler form a conventional plastic mold.

3 Claims, 5 Drawing Sheets

FIBER OPTIC SLEEVE WITH DRAFTED CORNER-WALL SECTIONS

BACKGROUND OF THE INVENTION

The present invention relates generally to a fiber optic sleeve, or coupler, and, more particularly, to an improved sleeve wherein alignment of the optical cables and ease of molding are facilitated.

A fiber optic sleeve generally interconnects a pair of fiber optic cables, such that the respective optical fibers align. As is well known in the art, a connector terminates at least one of the cables, holding the optical fibers in a precise arrangement or configuration.

The sleeve is typically a conventionally molded plastic material. The sleeve provides at least one connector passageway, adapted to receive the connector. One purpose of the sleeve is to properly position the connector therein, thereby facilitating ultimate alignment of the interconnected optical fibers.

Under optimum circumstances, the interior walls of the sleeve, defining the connector passageway, would closely correspond to the exterior walls of the connector. The interior walls would engage the connector about its entire periphery, as a square peg engages a tight-fitting square hole.

Unfortunately, this type of arrangement is virtually impossible in a molded sleeve. The connector passageway is created by mold pins, and the passageway must include drafted or tapered surfaces to remove the sleeve, once cured, from these mold pins. One sleeve providing the necessary alignment and draft is described in European Patent Application EP 0 973 052 A2. The teachings thereof are incorporated herein by reference.

SUMMARY OF THE INVENTION

In a principal aspect, the present invention is a fiber optic sleeve including a housing, having an end, a midpoint and a central axis. The housing provides a connector passageway extending along the central axis from the end to the midpoint thereof. The passageway is defined by at least first and second corner-wall sections and an interposed side-wall section.

The side-wall section is substantially planar and extends parallel to the central axis. The first and second corner-wall sections are generally L-shaped and taper towards the central axis. That is, from the end of the housing to the midpoint, the corner-wall sections converge towards the central axis. As such, the side-wall sections provide the necessary alignment and the corner-wall sections provide the necessary draft.

It is thus an object of the preset invention to provide an improved sleeve or coupler for simplex and duplex fiber optic cables. Another object is an improved, readily manufactured and inexpensive sleeve. Still another object is a coupler that combines accurate alignment with ease of molding.

These and other features, objects and advantages of the present invention are set forth or apparent in the following detailed description.

BRIEF DESCRIPTION OF THE DRAWING

A preferred embodiment of the present invention is described herein with reference to the drawing herein.

DETAILED DESCRIPTION OF A PREFERRED EMBODIMENT

Figure 1:
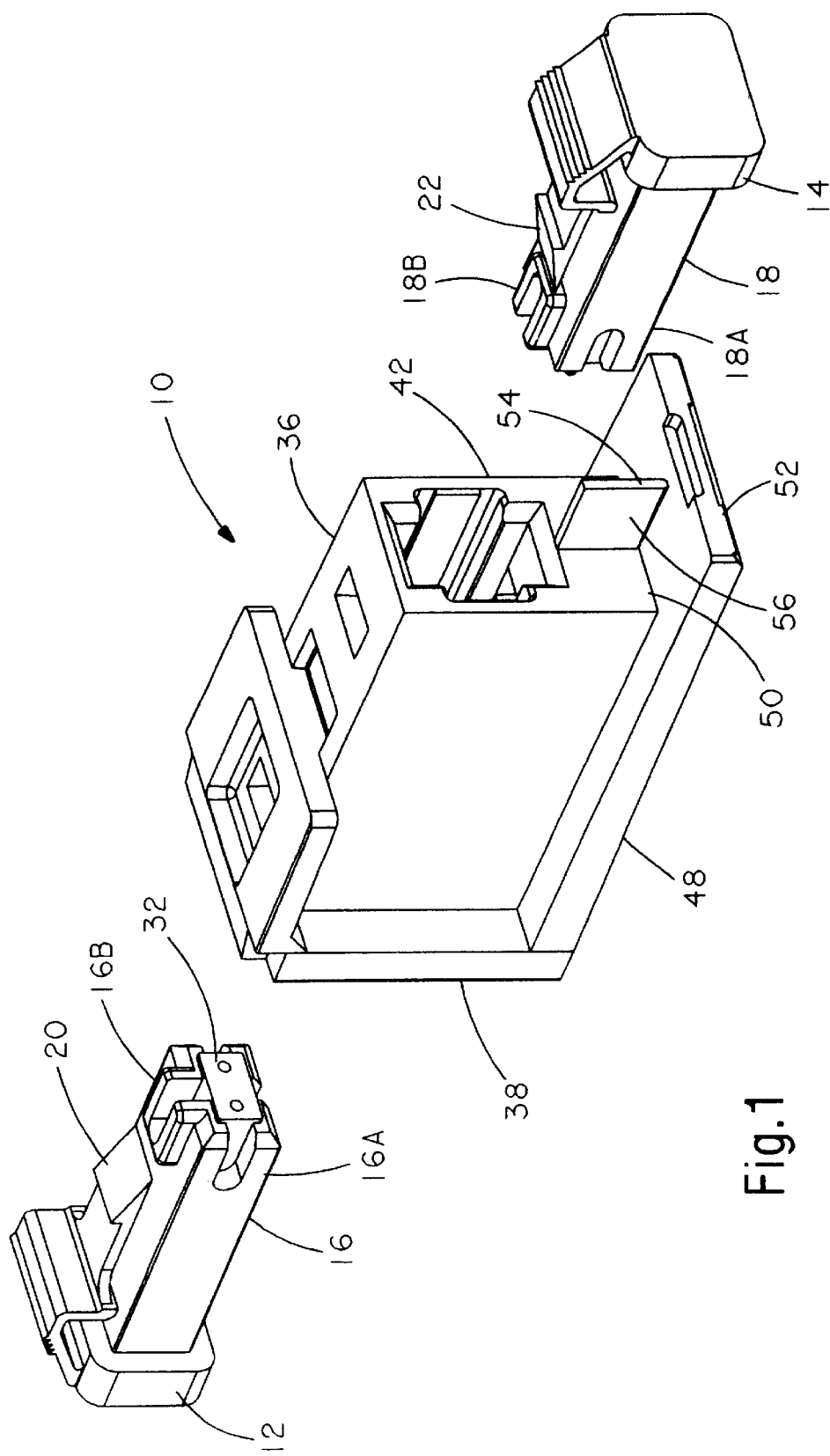
FIG. 1 is an exploded perspective view of the preferred embodiment, illustrating the connector sleeve and pair of duplex fiber optic cables for interconnection therein.

The present invention is shown in FIGS. 1–12 as a connector sleeve or coupler, generally designated 10. In this preferred embodiment, the sleeve 10 is utilized to interconnect, or couple, a first duplex fiber optic cable 12 to a second duplex fiber optic cable 14. As is well known in the art, the first and second fiber optic cables 12, 14 are terminated with first and second duplex connectors 16, 18, respectively, adapted to be received by the sleeve 10. Upon insertion to a predetermined depth within the sleeve 10, the connectors 16, 18 snap-locked thereto. More particularly, the first and second connectors 16, 18 include first and second substantially rectangular insert portions 16A, 18A and first and second key portions 16B, 18B extending therefrom, adapted to engage the sleeve 10. The connectors 16, 18 further include conventional latches 20, 22, respectively, to engage corresponding interlocking apertures in the sleeve 10.

As is well known in the art, the duplex cables 12, 14 include transmitting optical fibers 24, 26 and receiving optical fibers 28, 30, in a side-by-side arrangement. The fibers 24, 28 of the first cable 12 are terminated with a conventional, substantially rectangular female duplex ferrule assembly 32, and the fibers 26, 30 of the second cable 14 are terminated with a conventional, substantially rectangular male duplex ferrule assembly 34. The ferrule assemblies 32, 34 reside within the insert portions 16B, 18B of the connectors 16, 18, respectively. The transmitting fibers 24, 26 and receiving fibers 28, 30 are aligned, biased together and coupled within the sleeve 10 in a matched configuration.

The sleeve 10 includes a generally rectangular housing 36. The housing 36 has a front end 38 to receive the first connector 16 in a predetermined transmitting/receiving orientation. That is, the front end 38 is keyed to receive the first connector 16 in only one orientation, such that the transmitting optical fiber 24 is either in a left or right position (as viewed in FIG. 1). In this preferred embodiment, the front end 38 defines a substantially T-shaped front-end connector passageway 40 to provide the appropriate keying.

The housing 36 has a back end 42 to receive the second connector 18. The back end 42 defines a substantially planar back wall surface 44 and a substantially cross-shaped back-end connector passageway 46, such that the second connector 18 is partially insertable in one of two orientations. More particularly, the back-end passageway 46 will receive the second connector 18 with the latch 22 either "up" or "down" (as viewed in FIGS. 1 and 6–8). Whenever the second connector 18 is inserted and locked with the latch 22 in the "up" position, the cables 12, 14 are in the matched configuration. Whenever the second connector 18 is inserted and locked (as described in further detail below) with the latch 22 in the "down" position, the cables 12, 14 have the reversed configuration.

Figure 2:
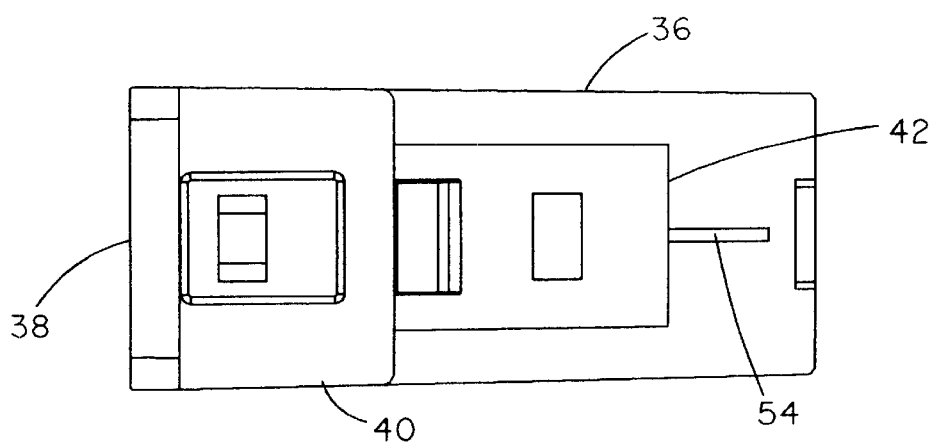
FIG. 2 is a top view of the sleeve shown in FIG. 1.
Figure 3:
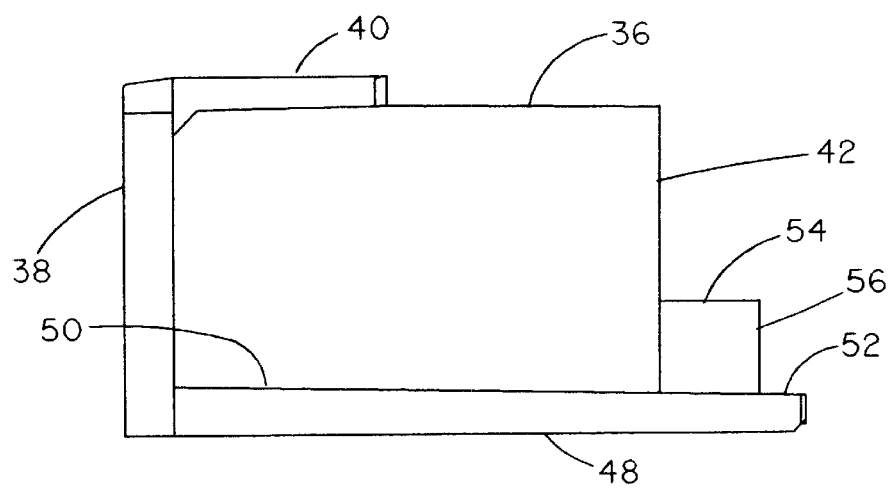
FIG. 3 is a side view of the sleeve shown in FIG. 1.
Figures 4, 5:
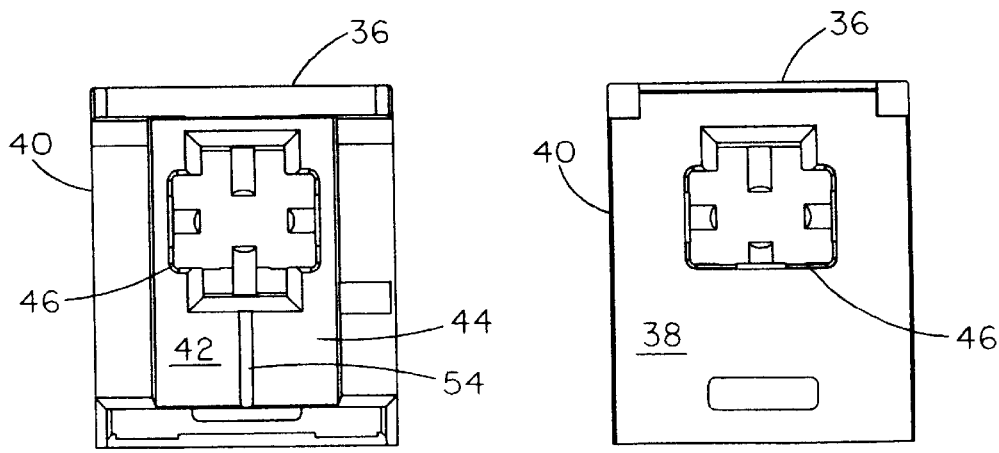
FIG. 4 is a back view of the sleeve shown in FIG. 1.
FIG. 5 is a front view of the sleeve shown in FIG. 1.
Figure 6:
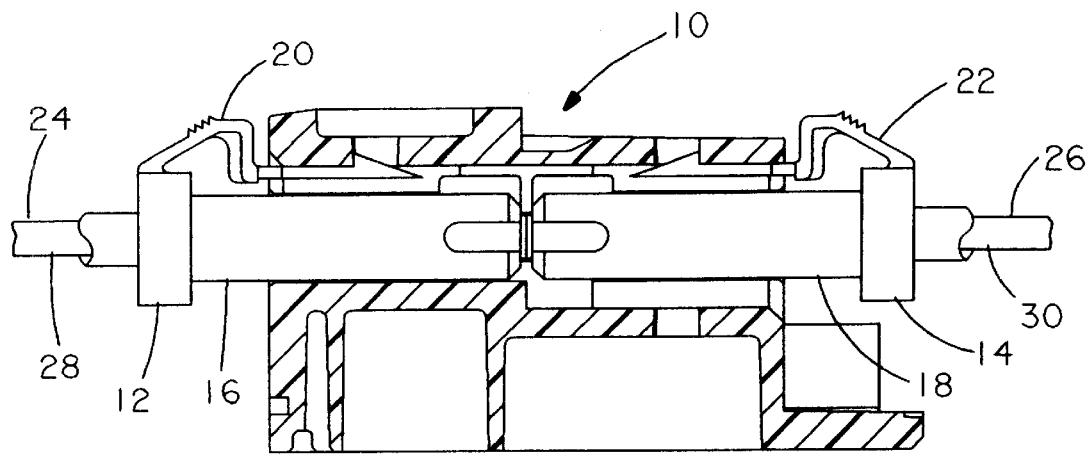
FIG. 6 is a partial cross-sectional view of the embodiment shown in FIG. 1, illustrating interconnection in a matched configuration.

As best shown in FIGS. 1 and 2, the sleeve 10 further includes a base 48, extending from the front end 38 along the bottom 50 of the housing 36. The base 48 extends beyond the back end 42 to provide a support flange 52 below the back aperture 46.

Figure 7:
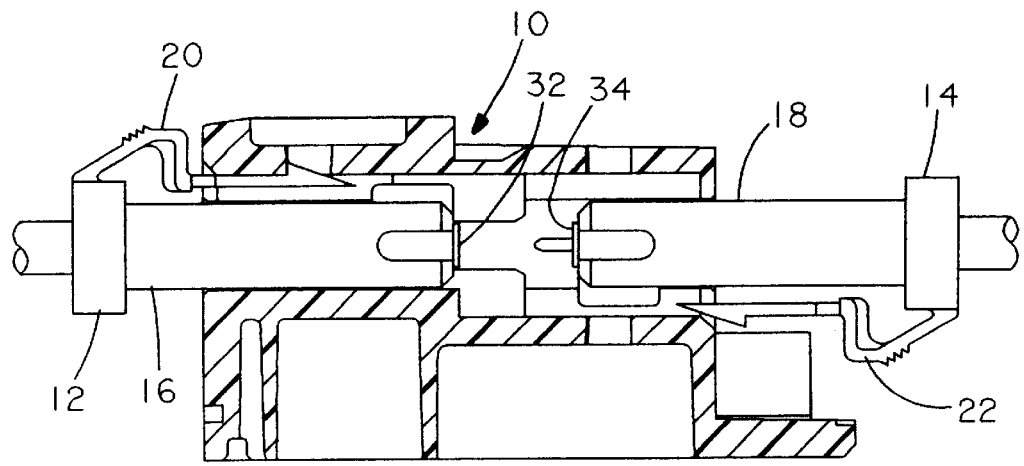
FIG. 7 is a partial cross-sectional view of the embodiment shown in FIG. 1, illustrating a prohibited reversed interconnection.

The sleeve 10 also includes a wall structure 54 extending from the housing 36. As best shown in FIG. 1, the wall structure 54 is a thin, substantially planar wall 56, integral with the housing 36, extending substantially perpendicular from the back wall surface 44 and support flange 52. The wall 56 engages the latch 22 of the second connector 18 prior to achievement of the back-end insertion depth, which is necessary to interlock the sleeve 10 and second connector 18, whenever the second cable 12 is inserted in the reversed orientation (as best shown in FIG. 7).

Figure 8:
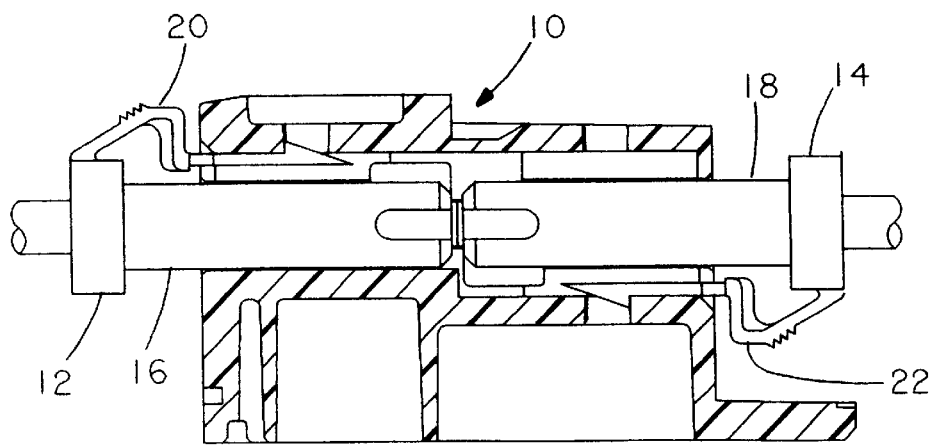
FIG. 8 is a partial cross-sectional view of the embodiment shown in FIG. 1, illustrating interconnection in a reversed configuration.
Figure 9:
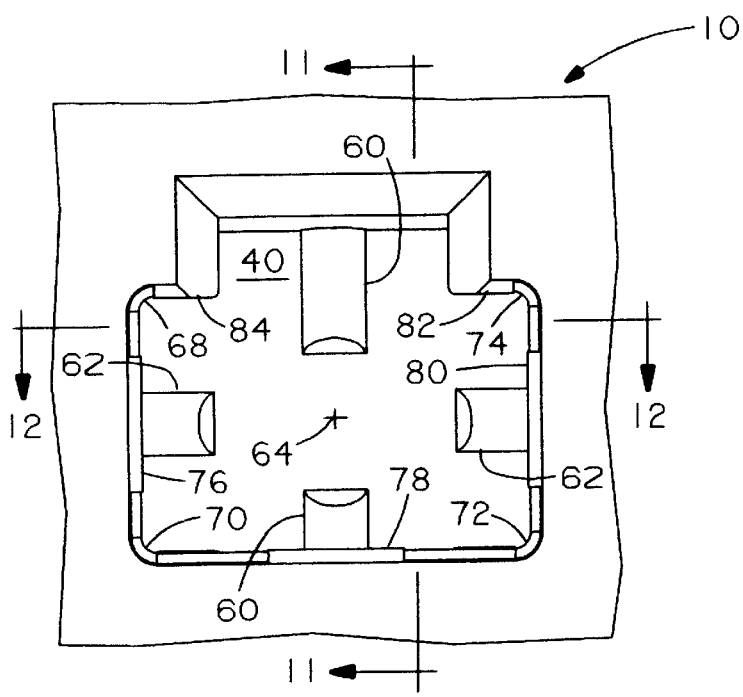
FIG. 9 is a partial enlarged front view of the housing as shown in FIG. 5.
Figure 10:
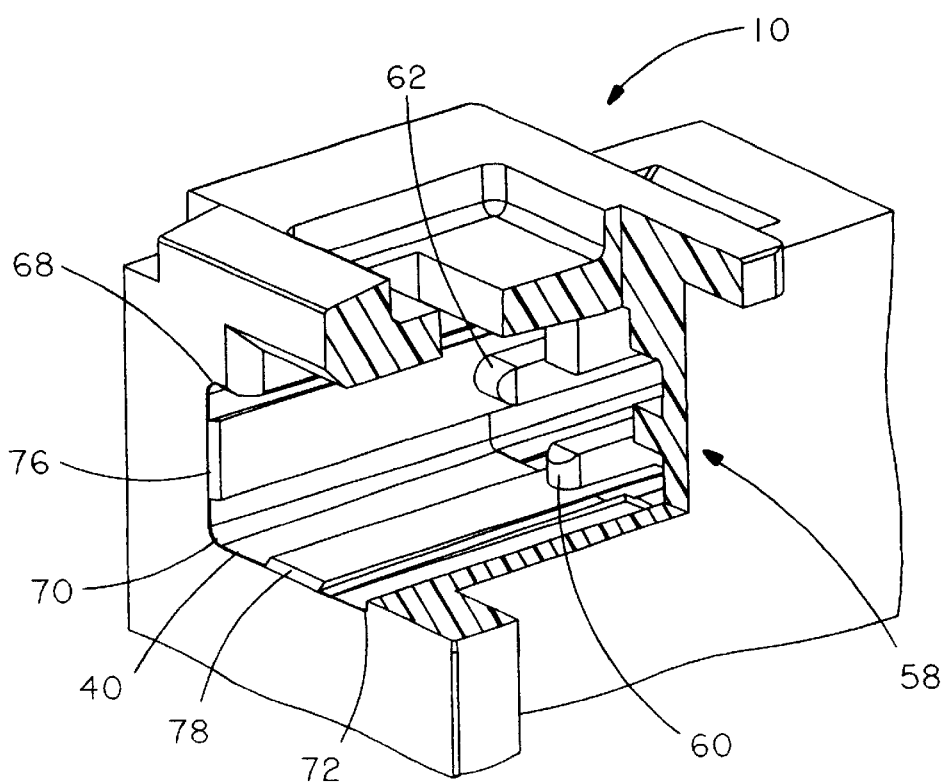
FIG. 10 is a partial enlarged, partial cut-away perspective view of the housing as shown in FIG. 1.
Figure 11:
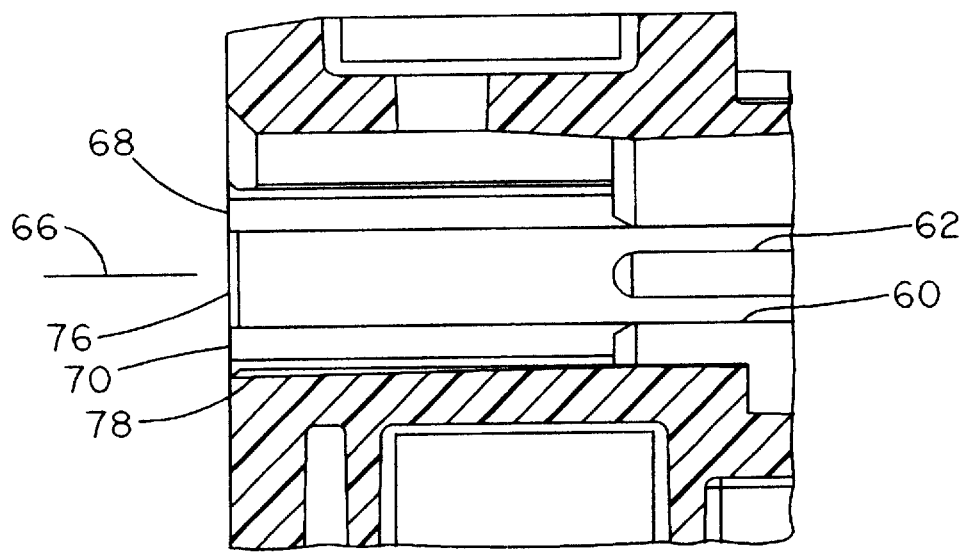
FIG. 11 is a partial cross-sectional view taken along 11—11 of FIG. 9.
Figure 12:
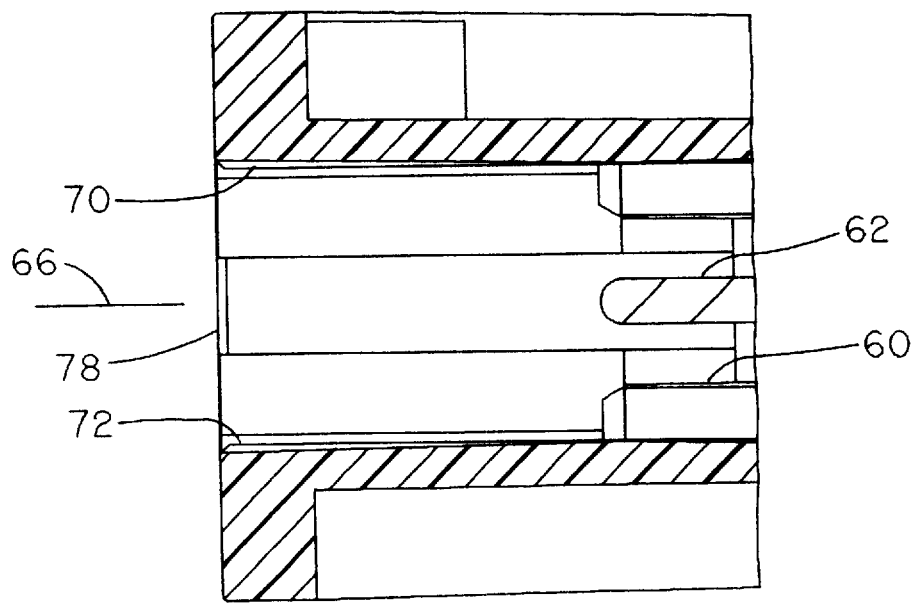
FIG. 12 is a partial cross-sectional view taken along 12—12 of FIG. 9.

The wall 56 is scored along the support flange 52 to facilitate detachment thereof. Once removed, interlocking of the second fiber optic cable 12 to the housing 36 in the reversed orientation is permitted (as best shown in FIG. 8).

Referring now primarily to FIGS. 9–12, the housing 36 defines a mid-point, generally designated 58, at which the ferrule assemblies 32, 34 mate. In the region of the mid-point 58, the housing 36 includes a first pair of opposed vertical guides 60 and a second pair of opposed horizontal guides 62, adapted to engage and position the insert portions 16B, 18B. The vertical guides 60 are substantially perpendicular to the horizontal guides 62, and theoretical extensions thereof define a passageway center 64 of the housing 36 or, more particularly, the front-end and back-end passageways 40, 46. The housing 36 further defines a central axis 66, extending longitudinally through the passageway center 64.

The front-end passageway 40 is partially defined by first, second, third and fourth substantially L-shaped corner-wall sections 68, 70, 72, 74; first, second and third interposed side-wall sections 76, 78, 80; and first and second end-wall sections 82, 84. Each of the side-wall sections 76, 78, 80, and end-wall sections 82, 84, is substantially planar and extends substantially parallel to the central axis 66, i.e., the side-wall sections 76, 78, 80, and end-wall sections 82, 84, do not diverge or converge with respect to the central axis 66. Each of the side-wall sections 76, 78, 80, and end-wall sections 82, 84, is also offset and inwardly displaced with respect to its corresponding pair of corner-wall sections 68, 70, 72, 74.

The side-wall sections 76, 78, 80, and end-wall sections 82, 84, closely correspond to the outer periphery of the insert portion 16A of the first connector housing 16. The side-wall sections 76, 78, 80, and end-wall sections 82, 84, engage the insert portion 16A upon insertion into the front-end passageway 40, operating as a guide therefor.

To facilitate molding of the sleeve 10, the four corner-wall sections 68, 70, 72, 74 converge towards the central axis 66 of the housing 36. The preferred angle of convergence is about one degree. This tapering provides the draft necessary to remove the sleeve 10 from the mold pins (not shown)

The same corner-wall/side-wall configuration is utilized in the back-end connector passageway 46. The convergence angles for the front and back ends 38, 42, respectively, must be adjusted if the mold pin division occurs on one side of the mid-point 58 of the housing 36.

A preferred embodiment of the present invention has been described herein. It is to be understood that modifications and changes can be made without departing from the true scope and spirit of the present invention, as defined by the following claims which are to be interpreted in view of the foregoing.

We claim:

1. A fiber optic sleeve comprising:

a housing having an end, a midpoint and a central axis, said housing providing a connector passageway extending along said central axis from said end towards said midpoint;

said connector passageway being defined by at least first and second corner-wall sections and at least a first side-wall section interposed said first and second corner-wall sections;

said first side-wall section being substantially planar and extending substantially parallel to said central axis;

said first and second corner-wall sections converging towards said central axis from said end to said midpoint of said housing at a predetermined convergence angle.

2. A fiber optic sleeve as claimed in claim 1 wherein said first side-wall section is substantially planar and offset with respect to said first and second corner-wall sections.

3. A fiber optic sleeve as claimed in claim 1 wherein said predetermined convergence angle is about one degree.

* * * * *